United States Patent
Guggenbichler

(10) Patent No.: US 12,484,585 B2
(45) Date of Patent: Dec. 2, 2025

(54) ZINC MOLYBDATE HAVING A TRICLINIC CRYSTAL STRUCTURE, AS AN ANTIMICROBIAL AGENT

(71) Applicant: AMISTEC GMBH & CO. KG, Kössen in Tirol (AT)

(72) Inventor: J. Peter Guggenbichler, Kössen in Tirol (AT)

(73) Assignee: AMISTEC GMBH & CO. KG, Kössen in Tirol (AT)

( * ) Notice: Subject to any disclaimer, the term of this patent is extended or adjusted under 35 U.S.C. 154(b) by 740 days.

(21) Appl. No.: 17/288,792

(22) PCT Filed: Oct. 25, 2019

(86) PCT No.: PCT/EP2019/079301
§ 371 (c)(1),
(2) Date: Apr. 26, 2021

(87) PCT Pub. No.: WO2020/084155
PCT Pub. Date: Apr. 30, 2020

(65) Prior Publication Data
US 2022/0007649 A1    Jan. 13, 2022

(30) Foreign Application Priority Data

Oct. 26, 2018  (EP) ..................... 18202862

(51) Int. Cl.
*A01N 59/16* (2006.01)
*A01N 25/08* (2006.01)
*A01N 25/12* (2006.01)

(52) U.S. Cl.
CPC ............. *A01N 59/16* (2013.01); *A01N 25/08* (2013.01); *A01N 25/12* (2013.01)

(58) Field of Classification Search
CPC ........ A01N 25/08; A01N 25/12; A01N 59/16; A01K 91/00
See application file for complete search history.

(56) References Cited

FOREIGN PATENT DOCUMENTS

| CN | 104671284 A | 6/2015 |
|---|---|---|
| DE | 102013114573 A1 | 6/2015 |
| JP | 2014-519504 A | 8/2014 |
| WO | 2012162557 A1 | 11/2012 |
| WO | 2015091993 A1 | 6/2015 |

OTHER PUBLICATIONS

Meng et al.; "Preparation of Molybdates with Antibacterial Property"; Key Engineering Materials; vols. 368-372; pp. 1516-1518; published online Feb. 11, 2008.*
Cordt Zollfrank et al, "Antimicrobial activity of transition metal acid MoOprevents microbial growth on material surfaces", Material Science and Engineering C., 2012, 32, 1:47-54.
Cezarina Cela Mardare et al, "Growth inhibition of *Escherichia coli* by zinc molybdate with different crystalline structures", Phys. Status Solidi A, 2016, 213, 6:1471-1478.
International Search Report and Written Opinion in PCT/EP2019/079301. Mailed Nov. 14, 2019. 15 pages.
Shafaei et al., "Polymorphs of molybdenum trioxide as innovative antimicrobial materials", Surface Innovations, vol. 1, Issue 514, pp. 202-208 (2013).
Office Action issued on Oct. 26, 2023, in Japanese Patent Application No. 2021-554787.
S.E. Karekar et al., "Chemical Engineering and Processing: Process Intensification," 2015, vol. 87, pp. 51-59 (published in Jan. 2015).
Eduok et al.: "Ultrasound-assisted synthesis of zinc molybdate nanocrystals and molybdate-doped epoxy/PDMS nanocomposite coatings for Mg alloy protection", Ultrasonics Sonochemistry, vol. 44, Feb. 23, 2018, pp. 288-298, XP085382778.
Office Action issued on Nov. 20, 2024, in European Patent Application No. 19790230.7 and machine translation.

* cited by examiner

*Primary Examiner* — Jeffrey T. Palenik
(74) *Attorney, Agent, or Firm* — Meunier Carlin & Curfman LLC

(57) ABSTRACT

Disclosed are methods of using a triclinic form of zinc molybdate ($ZnMoO_4$) as an antimicrobial agent, composite materials which include antimicrobial zinc molybdate, and processes for the production thereof, including ultrasound mediated processes for the production of triclinic zinc molybdate with a controlled average grain size.

2 Claims, 2 Drawing Sheets

ZINC MOLYBDATE HAVING A TRICLINIC CRYSTAL STRUCTURE, AS AN ANTIMICROBIAL AGENT

CROSS REFERENCE TO RELATED APPLICATIONS

Figure 1:
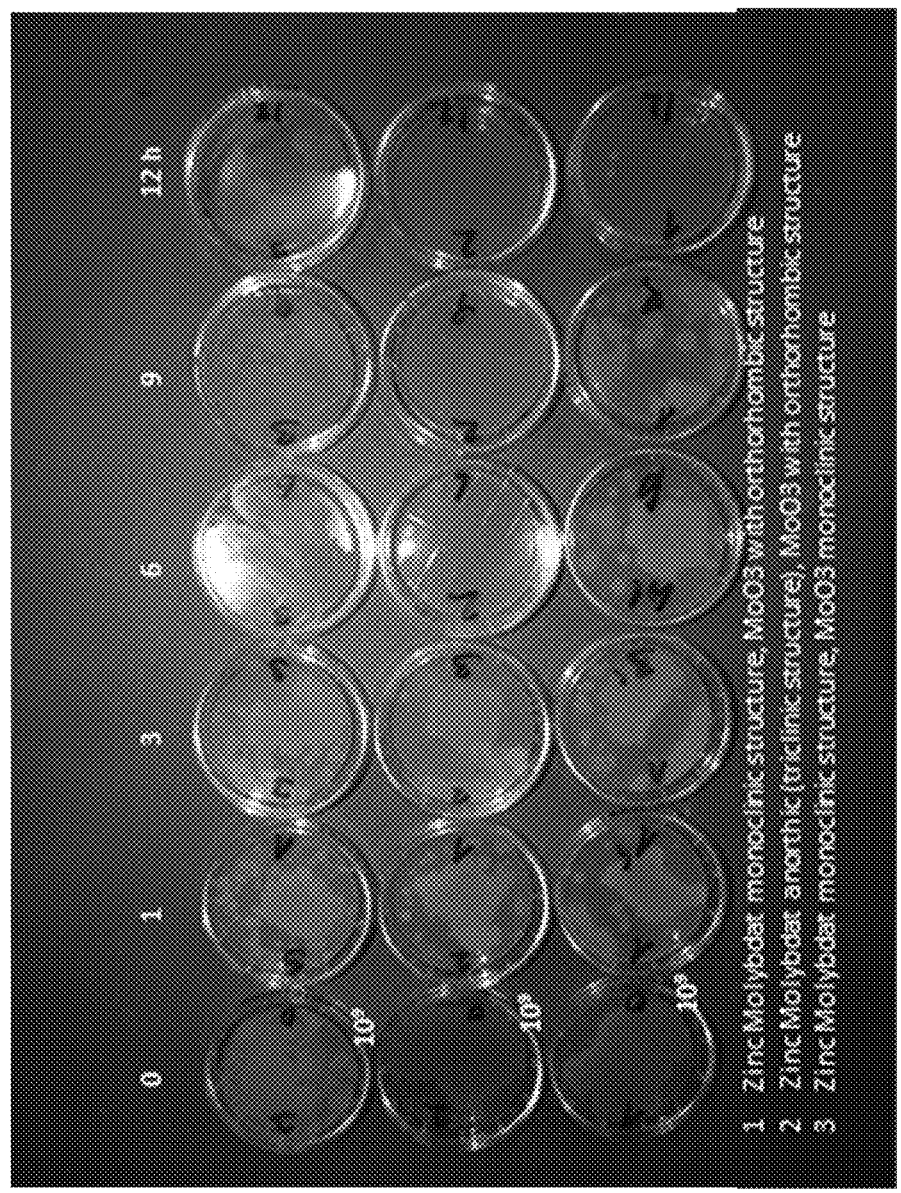

This application is a United States National Phase Patent Application of International Patent Application Number PCT/EP2019/079301, filed on Oct. 25, 2019, which claims the benefit of priority to European Application No. 18202862.1, filed Oct. 26, 2018, which are incorporated by reference herein in their entirety.

DESCPRIPTION

The invention relates to the use of a triclinic form of zinc molybdate ($ZnMoO_4$) as an antimicrobial agent, to composite materials which comprise such zinc molybdate, and to processes for the production thereof.

The surfaces of objects are treated with antimicrobial agents or provided with antimicrobial properties in order to prevent the accumulation of microorganisms. Disinfectants or biocides, among other things, are used to combat the microorganisms. However, a major disadvantage of using organic biocides is the development of resistance and cross-resistance among the microorganisms. Therefore, alternatives are increasingly being sought to effectively combat microorganisms and prevent the colonisation of surfaces with microorganisms. One possibility is to use metals and metal compounds. Because of their good antimicrobial effect, silver and copper in particular are frequently used. In a first variant, the elemental metal is provided in a form having the largest possible surface area in order to achieve a high level of activity. In particular, nanoparticles, foamed metal, or nanoparticles fixed on a carrier are commonly considered. A second variant provides for the provision of soluble metal salts which are incorporated, for example, in zeolites or directly in a composite material. However, it is disadvantageous that the noble metals or noble metal ions mentioned are comparatively expensive and, moreover, are almost completely inactivated by sulphur-containing compounds or high electrolyte concentrations.

Recently, the use of molybdates and tungstates as antimicrobial agents has also been discussed. These compounds are comparatively inexpensive and also non-toxic since they are practically insoluble in water. However, the antimicrobial effectiveness of the molybdates and tungstates investigated so far is often insufficient.

The object of the present invention is therefore to provide an antimicrobial agent with improved activity, and an inexpensive way of effectively protecting materials and surfaces against the colonisation of microorganisms.

Zinc molybdate, the antimicrobial effect of which has already been described in the specialist field, usually has a tetragonal crystal structure. It is insoluble in water and therefore practically non-toxic. In the present invention, however, it was surprisingly found that zinc molybdate, in addition to the known tetragonal crystal structure, can also be present in a stable manner in a triclinic crystal structure and in this form shows a significantly higher antimicrobial effectiveness than in other crystal forms. The effect is significantly improved compared to that of tetragonal zinc molybdate having the same grain size.

Triclinic zinc molybdate can be obtained by ultrasound-assisted reaction of a solution of one or more water-soluble molybdates with a solution of one or more water-soluble zinc (II) salts. In the presence of ultrasound, the water-insoluble zinc molybdate formed during the reaction of the educt salts precipitates in the form of triclinic crystals. Depending on the duration of the reaction and the sonication, the grain size of the triclinic crystals can vary.

A particularly good antimicrobial effectiveness was found according to the invention for zinc molybdate in the form of particles having a triclinic crystal structure and an average grain size in the range from 0.10 µm to 5.0 µm, preferably between 0.25 µm and 5.0 µm.

A first aspect of the invention therefore relates to the use of zinc molybdate as an antimicrobial agent, wherein $ZnMoO_4$ is in the form of particles having a triclinic crystal structure and an average grain size between 0.1 µm and 5.0 µm, preferably 0.25 µm and 5.0 µm. According to a further embodiment, the use of triclinic $ZnMoO_4$ having an average grain size in the sub-micron range, i.e. from 0.1 µm to less than 1.0 µm, is preferred.

Triclinic zinc molybdate is non-toxic to humans and animals and therefore has excellent biocompatibility. It can be produced comparatively inexpensively and shows a strong antimicrobial effect even in small quantities. In addition, zinc molybdate is not inactivated by sulphur-containing compounds or by a high concentration of electrolytes, but rather retains its effectiveness.

Zinc molybdate having a triclinic crystal structure and the grain size given above shows high antimicrobial activity against a broad spectrum of microorganisms, including algae, fungi and viruses, as well as gram-positive and gram-negative microorganisms, regardless of their antibiotic resistance. Examples of microorganisms against which triclinic zinc molybdate according to the invention is effective include, inter alia, *Lactobacillus acidophilus, Pseudomonas*, for example *P. aeruginosa, Salmonella*, for example *S. aureus, E. coli, Candida* Spp., *C. albicans, C. glabrata* and *C. tropicalis, Legionella*, listerias; viruses such as influenza, Epstein-Barr virus, rotaviruses and norovirus; as well as *Aspergillus niger, fumigatus* and *flavus*. With the same grain size, the antimicrobial effect is significantly higher than that of zinc molybdate having a different crystal structure. In a preferred embodiment of the invention, the zinc molybdate according to the invention is particularly effective against algae growth.

The grain size of $ZnMoO_4$ is preferably in the range of 0.10-2.5 µm, more preferably in the range of 0.15-2.5 µm, and more preferably in the range of 0.2 µm to less than 1.0 µm. Particles smaller than 0.10 µm and in particular nanoparticles are not provided according to the invention. It has been found that with a triclinic crystal structure of zinc molybdate having an average grain size in the micrometre range, an excellent antimicrobial effectiveness is achieved, so that the risks associated with nanoparticles can be avoided. Zinc molybdate having a triclinic crystal structure is particularly effective in the sub-micron range.

Triclinic zinc molybdate itself is insoluble in water. On contact with water or air humidity, zinc molybdate causes a lowering of the pH value. The zinc molybdate itself does not go into solution and is not broken down or washed out of a material.

For antimicrobial use, triclinic zinc molybdate can be used alone or in combination with other active ingredients and/or adjuvants. In a particularly preferred embodiment, triclinic zinc molybdate is combined with molybdenum oxide $MoO_3$, since this allows the antimicrobial effectiveness to be improved even further. $MoO_3$ can in principle have any desired crystal structure, for example orthorhombic or monoclinic. $MoO_3$ having an orthorhombic crystal structure has proven to be particularly advantageous according to the invention. Triclinic $ZnMoO_4$ and $MoO_3$ can be present in the form of a mixture of crystals or as mixed crystals. The use of a mixture or mixed crystal of triclinic $ZnMoO_4$ and orthorhombic $MoO_3$ is particularly preferred.

Further advantages result when triclinic zinc molybdate is used in combination with at least one hydrophilicising or hygroscopic agent. Particularly preferred hydrophilicising and hygroscopic agents are described below.

According to the invention, triclinic zinc molybdate can be incorporated into a material which is to be provided with antimicrobial properties, or at least deposited on its surface. This results in an antimicrobial composite material.

The invention accordingly also relates to an antimicrobially active composite material comprising $ZnMoO_4$ in the form of particles having a triclinic crystal structure and an average grain size between 0.1 μm and 5.0 μm, more preferably between 0.20 μm and 5.0 μm, more preferably between 0.25 μm and 5.0 μm, more preferably in the range from 0.50 μm to 2.5 μm, and even more preferably in the range from 0.70 μm to 1.5 μm. According to one embodiment, the use in the composite material of triclinic $ZnMoO_4$ having an average grain size in the submicron range, i.e. from 0.1 μm to less than 1.0 μm, is preferred.

In the context of the present invention, a composite material is understood to mean a material which consists of two or more materials connected to one another, at least one of the materials being the triclinic zinc molybdate as defined above. The further material can in principle be formed from any material and, for example, also be a composite material itself.

The presence of triclinic zinc molybdate gives a composite material according to the invention an antimicrobial effect. The adhesiveness of pathogenic germs is greatly reduced. The proliferation of microorganisms and the formation of biofilms are inhibited. This is of particular importance, for example, in hospitals, nursing homes, etc., since microorganisms in biofilms cannot, or at least not permanently, be removed by antibiotics, organic biocides, disinfectants and the like. Since a lowering of the pH value is only required in the region of the surface boundary layer of the composite material or of a component or product made therefrom, correspondingly small amounts of zinc molybdate in the region of the surface are sufficient to achieve the desired antimicrobial effectiveness.

In a preferred embodiment, the adhesion of algae and/or biofilms to surfaces is reduced. Accordingly, the use of the zinc molybdate according to the invention to prevent fouling, i.e. the undesired colonisation of organisms on technical surfaces, such as ship hulls, represents a preferred embodiment of the invention.

Triclinic zinc molybdate is substantially insoluble in water, so that it is not washed out of the composite material but remains there and its antimicrobial effectiveness is maintained over the entire service life of the composite material. In this context, it was surprisingly found that triclinic zinc molybdate is retained in the material even better than zinc molybdate having a different crystal structure.

The at least one further material of the composite material can in principle be selected from any material classes. For example, it can be an inorganic, metallic, ceramic or organic material or any combination thereof. Other possible materials are, for example, plastics, paints, lacquers, silicones, rubber, melamine, acrylates, methyl acrylates, waxes, epoxy resins, glass, metal, ceramics and others. In a preferred embodiment, the composite material according to the invention comprises at least one organic polymer or a compound and/or a silicone as a further material. The material in or on which the triclinic zinc molybdate is introduced for the purpose of the antimicrobial finish can form a solid and/or liquid matrix. It can be provided that triclinic zinc molybdate is added in such a way that it makes up between 0.1% and 10% (weight percent or volume percent) of the total weight or total volume.

The composite material can in principle be designed as a layer composite, fibre composite, particle composite or penetrating composite.

In principle, the composite material according to the invention can be solid or liquid under standard conditions. For example, the composite material can be in the form of a solution, suspension and/or dispersion, for example as a lacquer or liquid coating agent. The use of the zinc molybdate according to the invention as a lacquer or liquid coating agent is preferred. Lacquers or coating agents according to the invention can be applied to any suitable surface such as plastics, metals, wood, stone and other building materials. In such a case, the composite material is hardened after curing.

Triclinic zinc molybdate can be arranged on the surface of the composite material and/or distributed in the composite material. According to the invention, an arrangement of triclinic zinc molybdate in the region of the surface of the composite material is preferred, since an antimicrobial effect is desired here. For example, zinc molybdate can be applied to a substrate or carrier material as a layer or as a component of a layer. In principle, only one or more regions of the surface, or the entire surface, of the composite material can be antimicrobially finished with triclinic zinc molybdate. Alternatively or in addition, triclinic zinc molybdate can also be arranged within the composite material or distributed in the composite material. This ensures that the antimicrobial effect is permanently retained even if the composite material wears on its surface.

Depending on the intended use, the composite material in the context of the present invention can in principle be present as a semi-finished product, i.e. as a semi-finished material which only reaches its final form of use after further processing steps. Alternatively, the composite material can already be designed as a finished component, which can be used for its desired purpose without further processing steps.

A composite material according to the invention can contain triclinic zinc molybdate alone or in combination with other active ingredients and/or adjuvants. In a particularly preferred embodiment, triclinic zinc molybdate is combined with molybdenum oxide $MoO_3$, since this allows the antimicrobial effectiveness to be improved even further. $MoO_3$ can in principle have any desired crystal structure, for example orthorhombic or monoclinic. $MoO_3$ having an orthorhombic crystal structure has proven to be particularly advantageous according to the invention. Triclinic $ZnMoO_4$ and $MoO_3$ can be present in the form of a mixture of crystals or as mixed crystals. The use of a mixture or mixed crystal of triclinic $ZnMoO_4$ and orthorhombic $MoO_3$ is particularly preferred.

In a preferred embodiment, a composite material according to the invention has, in addition to triclinic $ZnMoO_4$ and possibly $MoO_3$, no additional antimicrobial compounds, such as silver or silver compounds, in particular nanosilver or soluble silver compounds such as silver nitrate or the like. Copper, organic biocides, zeolites and the like are also preferably not contained in a composite material according to the invention. In this way, better environmental compatibility and a considerable reduction in costs are achieved.

The mass content of triclinic zinc molybdate based on the total mass of the composite material is advantageously between 0.1 and 80% by weight, in particular between 1.5 and 30% by weight and preferably between 1.8 and 5.0% by weight. With this mass ratio, a particularly high antimicrobial effectiveness is ensured with the lowest possible use of zinc molybdate.

The use of particles having the aforementioned average grain sizes offers the particular advantage that, on the one hand, a particularly high antimicrobial effectiveness can be achieved and, on the other hand, the composite material according to the invention is free of nanoparticles. In addition, the introduction of $ZnMoO_4$ having a grain size according to the invention does not lead to any clouding of the correspondingly doped composite materials. Clear lacquers remain clear even after the $ZnMoO_4$ according to the invention has been introduced.

Further advantages result if triclinic zinc molybdate is used in combination with at least one hydrophilicising or hygroscopic agent which is arranged at least in the region of the surface of the composite material. In this way, the antimicrobial effectiveness is significantly increased in particularly dry environments, that is to say, for example, with very low air humidity and correspondingly small amounts of water available, which are important for the formation of an acidic surface boundary layer. Examples of suitable hydrophilicising and/or hygroscopic agents are, in particular, $SiO_2$, in particular in the form of silica gel or as pyrogenic silicon dioxide. These form a kind of moisture buffer and thus ensure a minimum level of moisture in the product. In addition, it was found that the association of triclinic zinc molybdate with $SiO_2$ has the effect that triclinic zinc molybdate is retained particularly well in the composite material and washing out can be completely prevented. $SiO_2$ is preferably used with a particle size distribution in the range between 0.25 μm and 25 μm average particle diameter.

Further examples of other hydrophilicising and/or hygroscopic agents that can be used according to the invention are organic acids, such as abietic acid, arachidonic acid, arachidic acid, behenic acid, capric acid, caproic acid, cerotic acid, erucic acid, fusaric acid, fumaric acid, bile acids, icosenoic acid, isophthalic acid, lactonic acid, laurinic acid, lignoceric acid, linolenic acid, levopimaric acid, linoleic acid, margaric acid, melissic acid, montanic acid, myristic acid, neoabietic acid, nervonic acid, nonadecanoic acid, oleic acid, palmitic acid, palmitoleic acid, pelargonic acid (nonanoic acid), pimaric acid, palustric acid, palmitic acid, ricinic acid, stearic acid, sorbic acid, tannic acid, tridecanoic acid, undecanoic acid and vulpinic acid. Furthermore, malonic acid, maleic acid and maleic anhydride, lactic acid, acetic acid, citric acid, salicylic acid and ascorbic acid and their salts have proven to be advantageous. Acid anhydrides, ampholytic substances, buffer systems, polymer acids, ion exchange resins, as well as acid sulfonates and acid halides can also be used.

The mass content of hydrophilicising and/or hygroscopic agent based on the total weight of the composite is advantageously in the range from 0.1% to 15%. For example, the mass content can be 0.5%, 1%, 2%, 3%, 4%, 5%, 6%, 7%, 8%, 9%, 10%, 11%, 12%, 13% or 14%. A mass content in the range between 1 and 5%, preferably in the range from 2-4%, is particularly advantageous. Furthermore, the mass content or the mass ratio of the hydrophilicising and/or hygroscopic agent can be set in such a way that it corresponds to the selected mass content of triclinic zinc molybdate.

In a particularly preferred embodiment, triclinic zinc molybdate is at least partially coated and/or agglomerated with the hydrophilicising and/or hygroscopic agent, in particular $SiO_2$. This ensures a spatial proximity of the two classes of compounds in a simple manner, so that zinc molybdate is immediately supplied with the moisture required to lower the pH value, even under particularly dry conditions.

In a further aspect of the present invention, the use of an antimicrobially active composite material as defined above for the production of an antimicrobially active product is provided.

Another aspect of the invention relates to a method for producing an antimicrobially active composite material as defined above. For this purpose, zinc molybdate is preferably provided in the form of particles having an average grain size between 0.10 and 5.0 μm, more preferably in the range from 0.15 μm to less than 1.0 μm, more preferably 0.20 μm to less than 1.0 μm and even more preferably from 0.25 μm to less than 1.0 μm, and is bonded with at least one further material.

Triclinic zinc molybdate can be produced by ultrasound-assisted reaction of one or more water-soluble molybdates with one or more water-soluble zinc (II) salts. For this purpose, aqueous solutions of molybdate and zinc salt are prepared separately from one another and brought into contact with the action of ultrasound. The presence of ultrasound causes zinc molybdate to crystallise out in a triclinic crystal structure. The particle size of the zinc molybdate can be adjusted by the duration and intensity of the ultrasound. In a preferred embodiment of the invention, triclinic zinc molybdate is produced by bringing an aqueous solution of one or more alkali or alkaline earth molybdates into contact with an aqueous solution of one or more zinc (II) salts. Sodium molybdate dihydrate, for example, can be used as the water-soluble zinc molybdate. For example, a zinc halide such as zinc chloride can be used as the zinc (II) salt. The two salt solutions are preferably reacted at room temperature in the presence of ultrasound at a frequency of more than 15 kHz, in particular 20-30 kHz. For the best possible effectiveness, zinc molybdate must be present in a crystal lattice that is as free of defects as possible. This is ensured by ultrasound treatment. A mixture of the reactants as water-soluble molybdates with one or more water-soluble zinc salts without energy input does not lead to the formation of an optimal crystal structure, which is expressed by a lack of effectiveness or reduced effectiveness compared to the optimal crystal structure according to the invention.

The production of triclinic $ZnMnO_4$ by means of ultrasound also allows, in particular, the defined provision of particles in the submicron range, i.e. in the context of the invention greater than 0.1 μm and smaller than 1 μm.

In the production of a composite material, the triclinic zinc molybdate is advantageously combined with at least one hydrophilicising and/or hygroscopic agent as defined above, the hydrophilicising and/or hygroscopic agent being arranged at least in the region of the surface of the composite material. It has proven to be particularly advantageous to coat and/or to agglomerate zinc molybdate at least partially with the hydrophilicising and/or hygroscopic agent, in particular $SiO_2$.

The lack of water solubility of zinc molybdate according to the invention was demonstrated in wipe tests. After wiping melamine resin samples comprising zinc molybdate according to the invention 10,000 times with a water-alcohol mixture, neither zinc molybdate nor zinc nor molybdenum could be detected in the wiping textile. The antimicrobial effect of the corresponding melamine resin samples, on the other hand, was unchanged.

The invention will be further illustrated using the following images and examples.

Images

FIG. 1 shows the antimicrobial effectiveness of different crystal forms of zinc molybdate: 1) monoclinic $ZnMoO_4$ with orthorhombic $MoO_3$; 2) triclinic $ZnMoO_4$ with orthorhombic $MoO_3$; 3) monoclinic $ZnMoO_4$ with amorphous $MoO_3$. Triclinic zinc molybdate is clearly superior to other crystal forms and shows that the examined sample is completely sterile after just 6 hours.

The tests for effectiveness were carried out with 3 ATCC reference germs (*S. aureus* ATCC 25923, *E. coli* ATCC 25022 and *P. aeruginosa* ATCC 15442). All the germs listed were susceptible. No resistant germ was found; *Lactobacillus acidophilus* (acid-resistant) was also eradicated.

Figure 2:
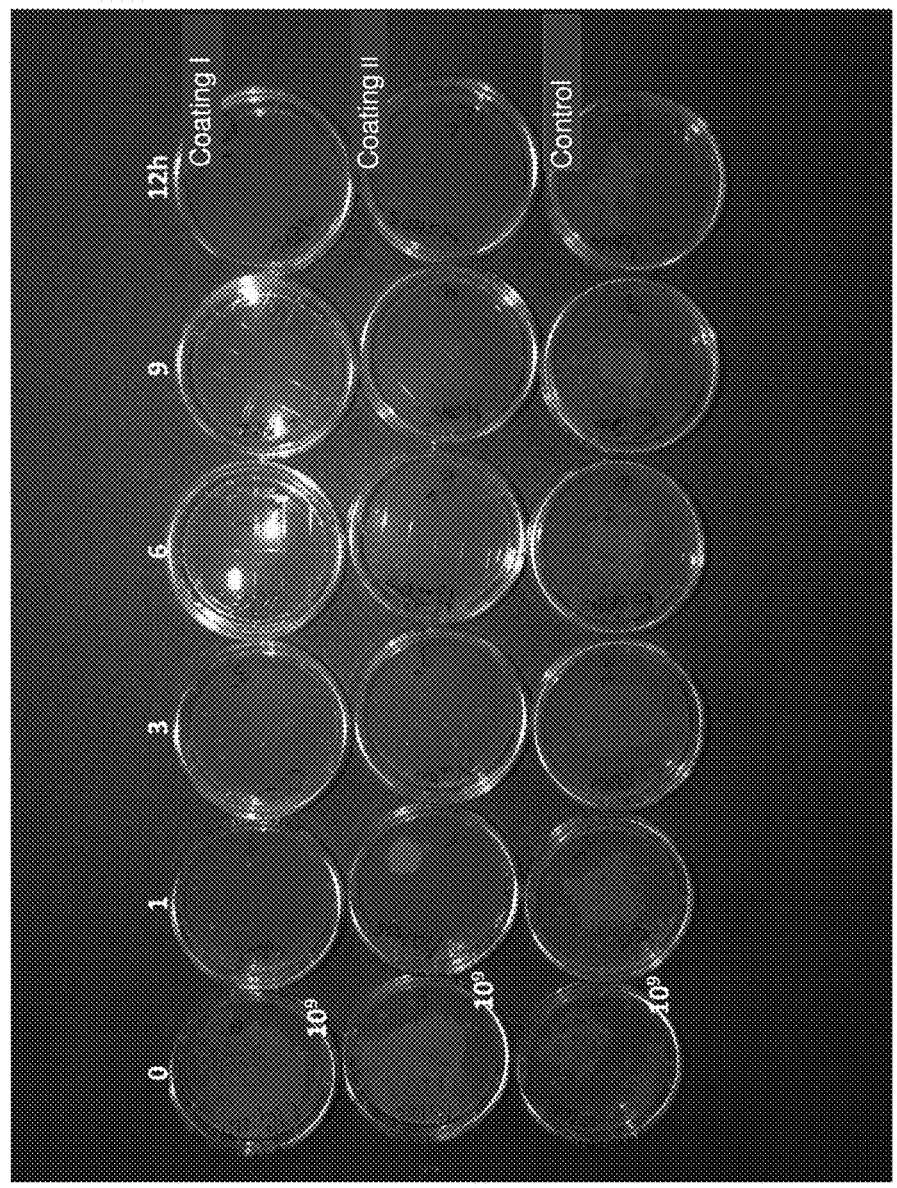

FIG. 2 shows the antimicrobial effectiveness of two different $SiO_2$ coatings on hospital tables (coating I & coating II) with 0.2 μm grain size of zinc molybdate against *Staphylococcus aureus*. The coatings comprising zinc molybdate according to the invention show a significant reduction after 1 and 3 hours, and complete sterility after 6 hours.

The invention claimed is:

1. A method comprising, utilizing zinc molybdate ($ZnMoO_4$) as an antimicrobial agent, wherein the $ZnMoO_4$ consists of particles having a triclinic crystal structure and an average grain size of 0.2 μm, wherein the $ZnMoO_4$ is free of particles having a grain size smaller than 0.1 μm.

2. The method according to claim 1, wherein the $ZnMoO_4$ particles are used in combination with $MoO_3$.

* * * * *